INVENTOR.
CHARLES E. WADE
By White & Hoefliger
ATTORNEYS.

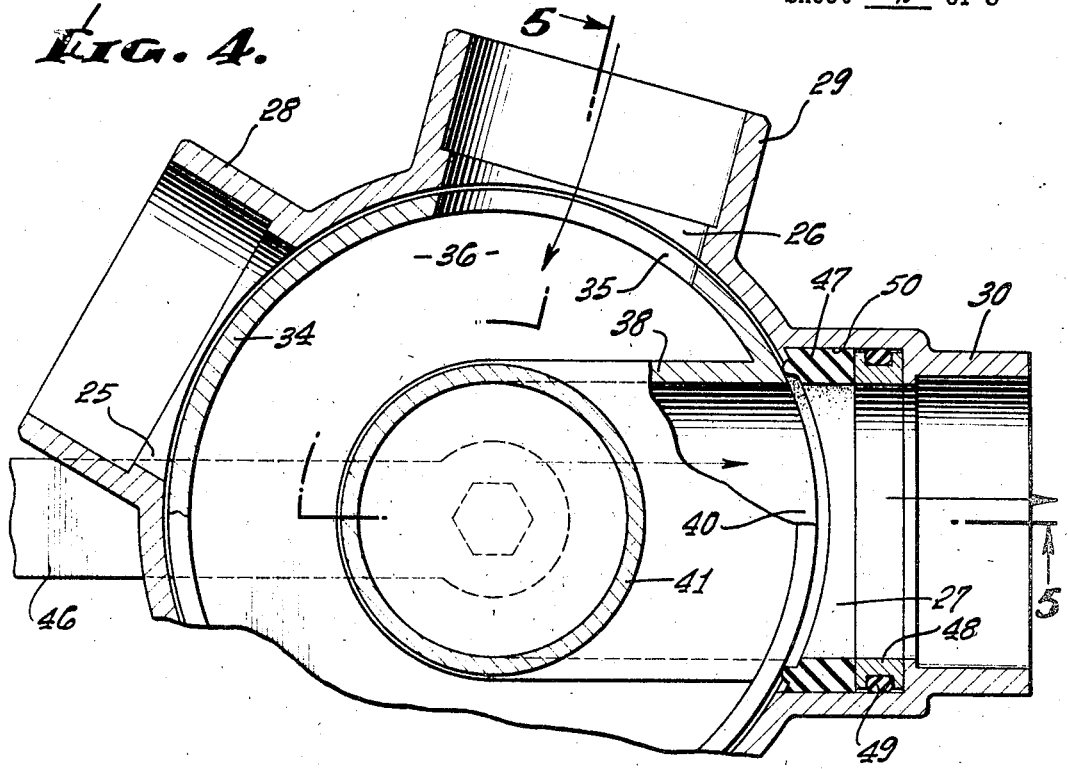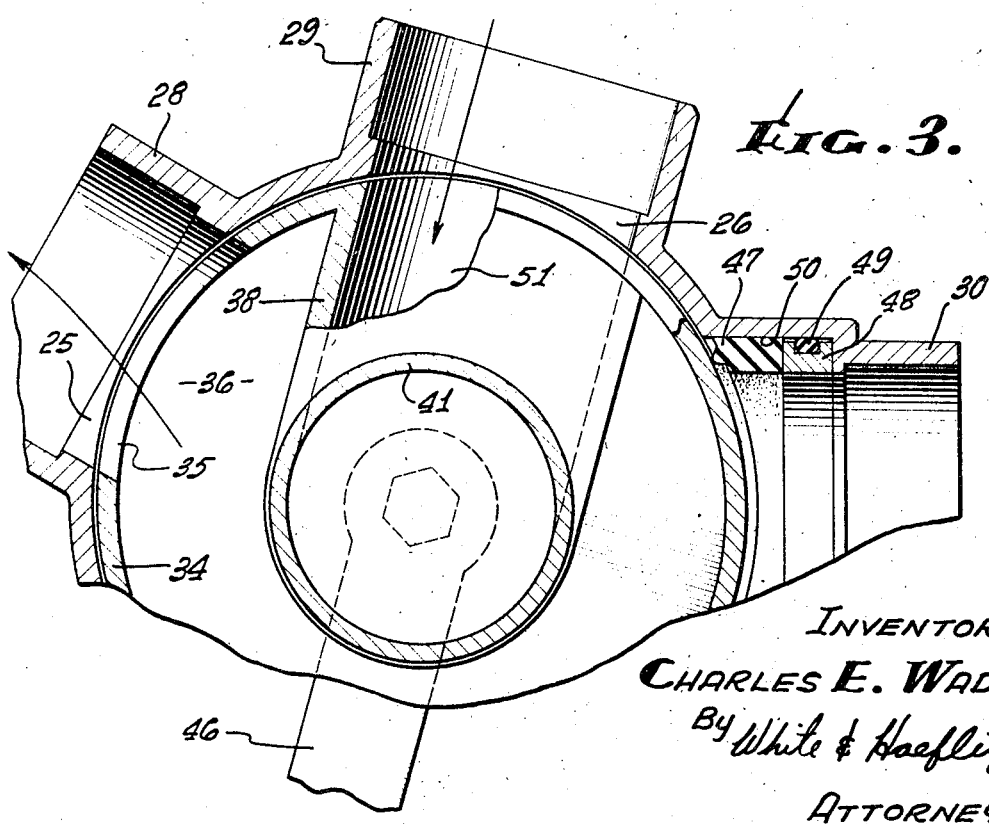

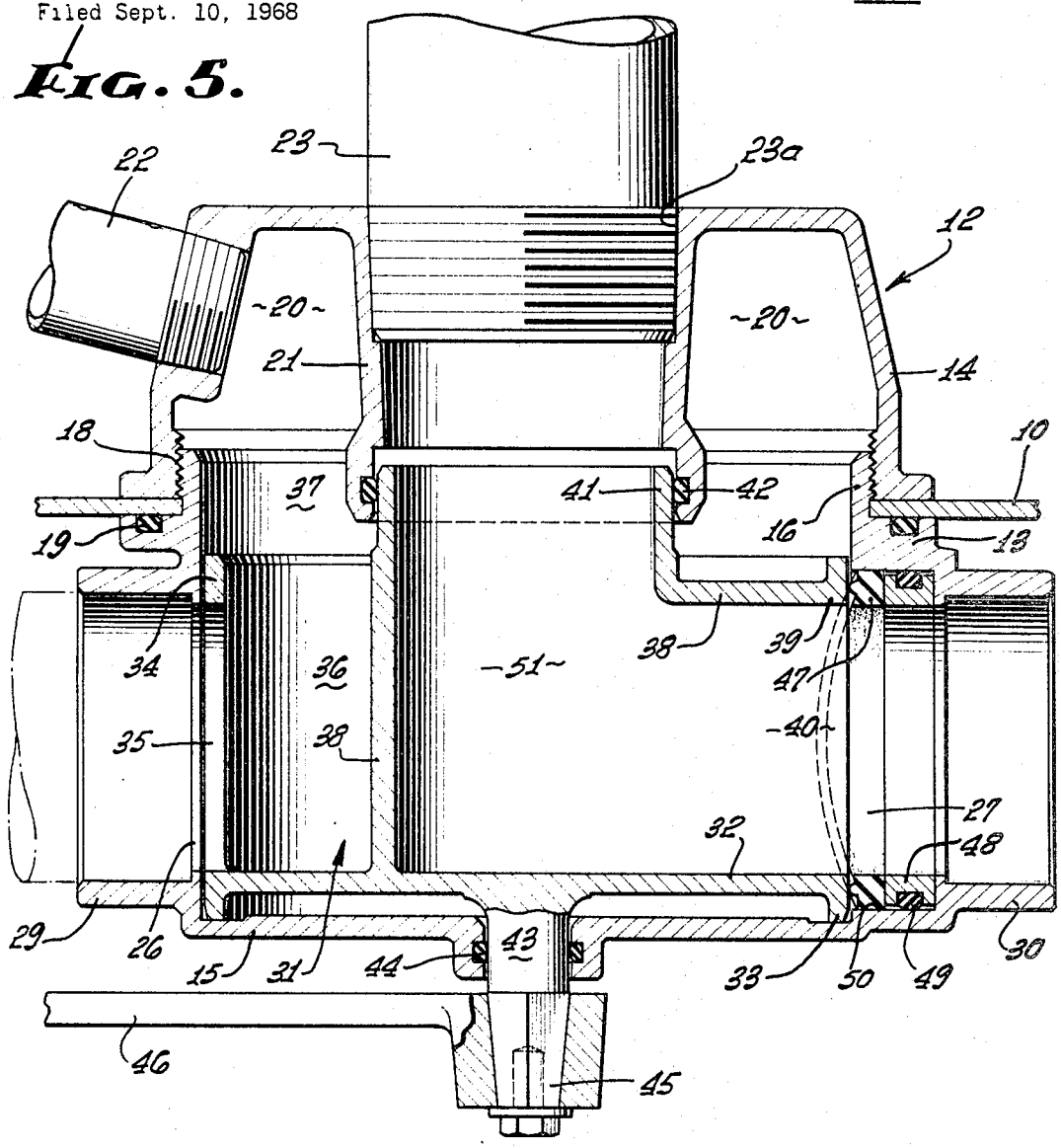

United States Patent Office 3,451,554
Patented June 24, 1969

3,451,554
SWIMMING POOL FILTER WITH ALTERNATE FLOW VALVE CONTROL
Charles E. Wade, Covina, Calif., assignor to Purex Corporation, Ltd., Lakewood, Calif., a corporation of California
Filed Sept. 10, 1968, Ser. No. 758,913
Int. Cl. B01d 29/38, 29/08
U.S. Cl. 210—278
9 Claims

ABSTRACT OF THE DISCLOSURE

A simplified control of swimming pool filters for normal water flow to the pool through a filtering medium, and for occasional reverse back-wash flow through the filter medium.

Such control is accomplished by a valve structure applied to the bottom of the filter vessel and including a rotary plug valve within a sectional body having external conduits for water distribution within the filter medium, the valve being capable of manual oscillation between flow reversing positions and the body sections being formed and interconnected to clamp between them the bottom wall of a filter vessel.

Summary of the invention

The invention is directed generally to improvements in reversible flow swimming pool filters which operate normally to pass through a filtering medium, e.g. sand or a particulated bed, a flow of recirculated pool water for such periods as the medium retains filtering efficiency. When through foreign accumulations, proper efficiency is lost, such accumulations are dislodged and removed from the filtering medium by back-washing, i.e. reversing the water flow therethrough to waste disposal.

Heretofore, provisions for back-washing have required relatively complex piping and valvular arrangements which involve to the user, inconveniences and possible confusion in operation.

The present invention has for its general object to reduce the necessary normal and back-wash flow control to a single valve structure which assures utmost convenience by reason of its simple, two position operation.

Structurally, the present filter provides a practical and conveniently operable three-way valve structure mounted to or within the bottom of a filter vessel, and which may be reduced to essentially three parts: a two section ported body and a plug valve rotatable between two control positions.

In preferred form, the valve structure includes a separable body having an upper manifold chamber and a ported lower section containing the plug valve which in one position directs inlet water flow through means associated with the body for distributing the water within the filter medium and returning the water to the manifold chamber and an outlet for recirculation. Upon alternation of the valve, the same distribution means adapts to reverse the water flow through the filter medium to a disposal outlet.

In addition to these more general aspects, the invention has various additional features and objects related to the details of the valve and body constructions and relationships, as well as the externally associated water distribution arrangements, all of which will be understood most readily from the following description of an illustrative embodiment shown by the accompanying drawings, in which:

Brief description of the drawing

FIG. 3 is a fragmentary enlarged sectional showing of the valve in normal position;

FIG. 4 is a view similar to FIG. 3 in which the valve is in back-wash position; and FIG. 5 is a section on broken line 5—5 of FIG. 4.

Description of the preferred embodiments

Figure 1:
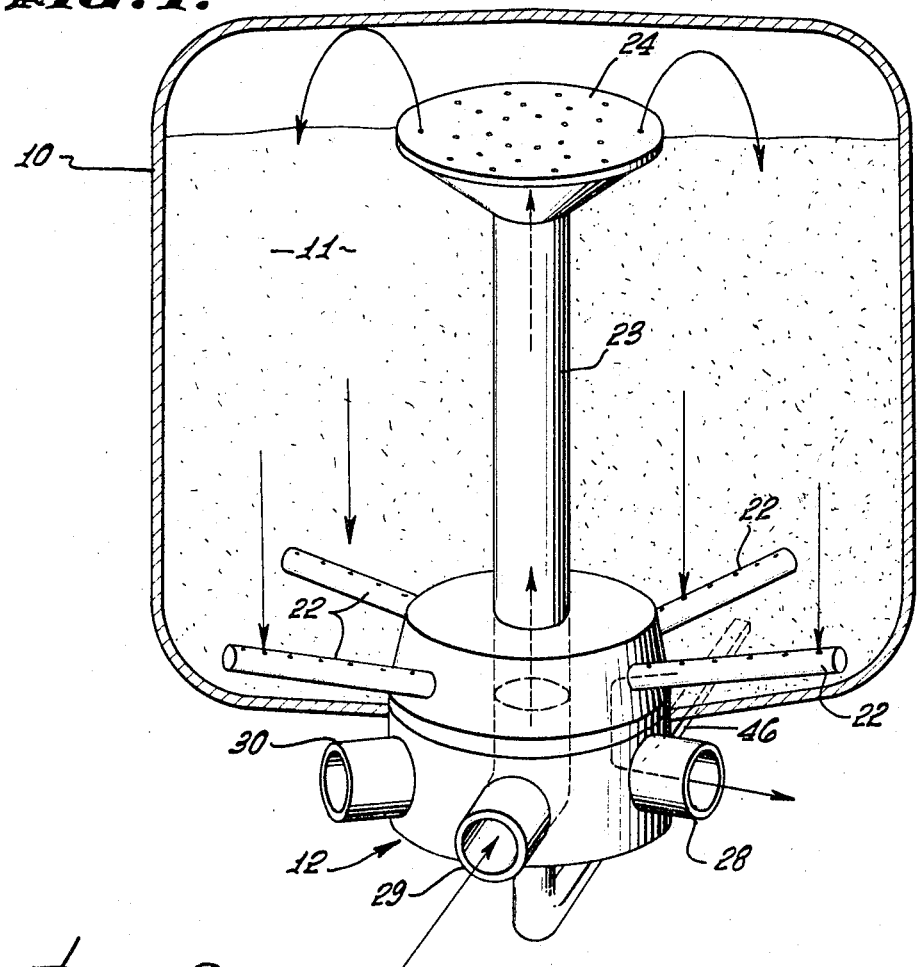
FIG. 1 is an illustration in perspective of a sectional filter equipped with the flow control valve and associated piping.

In reference first to FIG. 1, the showing of filter vessel 10 is to be regarded merely as illustrative of any of various types and configurations of vessels suitable for pool water filters. Similarly, the showing at 11 of sand or other particulate material is intended to be typical only of various materials or means useable as filtering media and subject to dislodgement of clogging accumulations by water back-wash as later described.

Reversible flow of water through the filter is controlled by a valve structure generally indicated at 12 and mounted to the bottom wall of the filter vessel. Referring to FIG. 5, the valve assembly is shown to comprise a body 13 having upper and lower sections 14 and 15, neck 16 of the lower section being received within the vessel bottom opening and threaded at 18 into the upper section to clamp the vessel bottom between the sections. Take-up of the connection at 18 serves also to press and maintain O-ring 19 into sealing engagement with the vessel surface.

Body section 14 contains an annular manifold chamber 20 about tubular boss 21 and from which extend radial, circularly spaced perforated pipes 22 within the bottom portion of the vessel 10 and the filter medium 11. These pipes may be present in such numbers and circular orientation as will promote uniformity of water flow through the filter bed. Also carried by the upper body section is a riser pipe 23 threaded at 23a into the boss 21, the pipe carrying suitable means such as an apertured head 24 for also promoting uniformity of water flow through the filter medium about the pipe.

The lower body section 15 has circularly spaced radial ports 25, 26 and 27 defined respectively by the tubular body water outlet 28, inlet 29 and back-wash discharge extensions 30 for connection with piping (not shown) connecting with a swimming pool and in the case of the back-wash discharge, with sewer or other waste water disposal.

Body section 15 also contains a rotary plug valve generally indicated at 31 shaped to have a bottom portion 32 flanged at 33 to rotate on the bottom of the body, the valve having also a cylindrical periphery 34 containing an opening 35 registrable alternately with ports 25 and 26. Inside the ported periphery the valve contains a hollow 36 in open communication through space 37 with the manifold chamber 20, the hollowed configuration accommodating an angular or elbowed interior 38 the side extent 39 of which forms a port and passage 40 rotatable into and out of registry with the back-wash port 27. The inner and upper extent 41, being in axial alignment with the valve body and pipe 23, is received within the lower end of tubular boss 21 and is sealed against water leakage by O-ring 42. Thus the valve is adapted to function as a ported plug for controlling a reverse water flow through pipe 23 to or from the ports 25, 26 and 27, as will later appear.

The valve 31 has a bottom extension 43 passing through O-ring 44 in the body 15 and connected at 45 with handle 46 for readily accessible manual rotation to oscillate the valve between its flow control positions.

Suitable means is provided for maintaining the valve in sealed relation with the back-wash port 27, typically by an elastomeric seal ring 47 backed by ring 48 and O-ring 49, all contained within the body recess 50.

In considering the operation of the filter, assume first the valve 31 to be in the FIG. 3 position wherein the elbow passage 51 is registered with inlet port 26 and the valve chamber or hollow 36 is in communication through opening 35 with the outlet port 25. So positioned, the valve directs water being pumped from the swimming pool, upwardly through pipe 25 for distribution through the head 20 downwardly within the filter medium 11 to the perforated pipes 22 from which the return water flows into manifold chamber 20 and thence to the outlet 25. This is the normal flow condition and continues until foreign accumulations within the filter medium so restrict the flow therethrough as to require removal.

Figure 2:
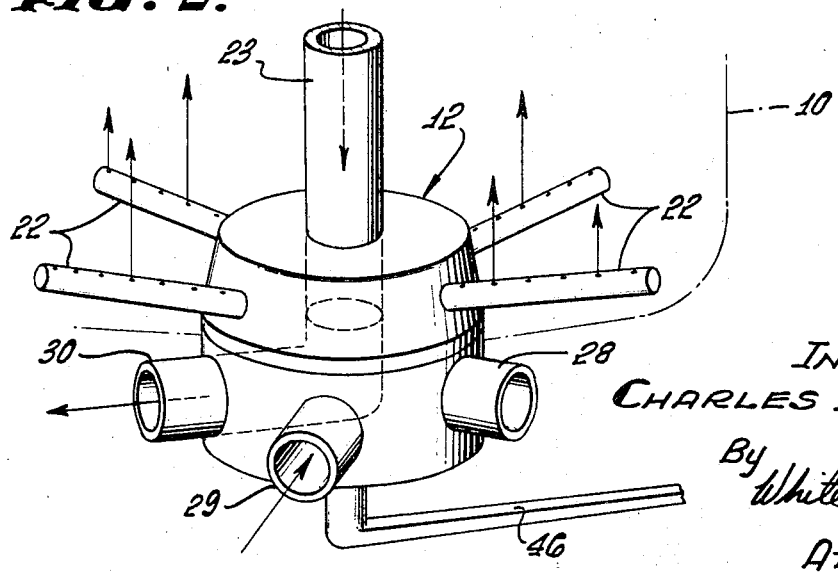
FIG. 2 similarly illustrates the valve in changed position.

Such removal is accomplished simply by rotating the valve to its FIG. 4 position in which the outlet port 25 is closed and water flows from the inlet 26 into the valve chamber 36 and manifold chamber 20 to pipes 22 from which, as indicated in FIG. 2, the water flows upwardly through the filter bed and then down through pipe 23 and valve passage 51 to the open back-wash port 27 for disposal. Upon completion of the back-wash, the valve may be restored to its FIG. 3 position for continued normal water flow through the filter.

I claim:

1. A swimming pool filter comprising a vessel containing a water filtering medium, a valve structure applied to the bottom of said vessel for controlling reverse fluid flow through the filtering medium, said valve structure comprising a hollow body having upper and lower sections, the lower section containing below the vessel circularly spaced ports respectively defining a fluid inlet, an outlet and a back-wash discharge, said upper section containing a manifold chamber with passage means communicating with the interior of the vessel for reverse flow of fluid to and from the filtering medium, a rotary plug valve within the lower body section operable to selectively open and close said ports, means forming within the plug valve a fluid passage extending radially inward from the valve periphery and thence axially within said manifold chamber to deliver fluid to and from the filter medium, and a valve handle below said body operable to oscillate the valve between a first position in which fluid flows from the inlet through said fluid passage in the valve to the filter medium and reversely therefrom through the manifold chamber to said outlet while the back-wash port is closed by the valve, and a second position communicating said inlet with the manifold chamber and the valve passage with said outlet.

2. A filter according to claim 1, in which said manifold chamber passage means comprise circularly spaced conduits extending outwardly from the upper body section.

3. A filter according to claim 2, in which said conduits are perforated pipes extending radially within the bottom portion of the vessel and filtering medium.

4. A filter according to claim 1, including a pipe extending upwardly from said upper body section within the filter medium and communicating with said fluid passage in the valve.

5. A filter according to claim 1, in which said valve has an internal hollow in open communication with said manifold chamber and containing an essentially elbow configuration defining said valve passage.

6. A filter according to claim 5, in which said upper body section includes an internal tubular boss within which the upper end of said elbow configuration is rotatable, and a pipe connected to and extending upwardly from said boss.

7. A filter according to claim 6, including a fluid seal between said upper end of the elbow configuration and said boss.

8. A filter according to claim 5, including an annular fluid seal within the back-wash discharge port and engageable by the valve periphery.

9. A filter according to claim 1 in which said valve body sections are separable and the bottom wall of the vessel is clamped between interengaged threaded portions of the sections.

References Cited

UNITED STATES PATENTS

| 524,155 | 8/1894 | Williamson et al. | 210—288 X |
| 2,458,893 | 1/1949 | Campbell | 210—288 X |
| 2,462,154 | 2/1949 | Barnes | 210—278 X |

SAMIH N. ZAHARNA, *Primary Examiner.*

U.S. Cl. X.R.

210—279, 288